United States Patent
Coemans et al.

(10) Patent No.: US 8,424,149 B2
(45) Date of Patent: Apr. 23, 2013

(54) WIPER BLADE

(75) Inventors: Wildrik Coemans, Borgloon (BE);
David Van Baelen, Winksele (BE);
Peter Saevels, Attenrode (BE); Hans Beelen, Herk de Stad (BE)

(73) Assignee: Robert Bosch GmbH, Stuttgart (DE)

( * ) Notice: Subject to any disclaimer, the term of this patent is extended or adjusted under 35 U.S.C. 154(b) by 854 days.

(21) Appl. No.: 12/519,192

(22) PCT Filed: Nov. 15, 2007

(86) PCT No.: PCT/EP2007/062365
§ 371 (c)(1),
(2), (4) Date: Oct. 21, 2009

(87) PCT Pub. No.: WO2008/071510
PCT Pub. Date: Jun. 19, 2008

(65) Prior Publication Data
US 2010/0101041 A1  Apr. 29, 2010

(30) Foreign Application Priority Data
Dec. 14, 2006  (DE) .......................... 10 2006 059 077

(51) Int. Cl.
*B60S 1/38* (2006.01)
(52) U.S. Cl.
USPC ..................................................... 15/250.201
(58) Field of Classification Search ............. 15/250.201, 15/250.451–250.454, 250.361, 250.43, 250.44
See application file for complete search history.

(56) References Cited

U.S. PATENT DOCUMENTS

| 4,156,951 | A | 6/1979 | Sharp |
| 4,679,276 | A * | 7/1987 | Tomkin ..................... 15/250.454 |
| 6,253,412 | B1 | 7/2001 | Herrmann et al. |
| 2002/0148063 | A1 * | 10/2002 | De Block et al. .......... 15/250.43 |
| 2006/0107485 | A1 * | 5/2006 | Kim ......................... 15/250.201 |
| 2006/0112511 | A1 * | 6/2006 | Op't Roodt et al. ....... 15/250.43 |
| 2007/0240271 | A1 | 10/2007 | Wilms et al. |
| 2007/0289082 | A1 | 12/2007 | Herinckx et al. |
| 2008/0016643 | A1 | 1/2008 | Braun et al. |

FOREIGN PATENT DOCUMENTS

| DE | 10245693 | A1 | 4/2004 |
| WO | WO2005/092680 | * | 10/2005 |
| WO | WO2005/115813 | * | 12/2005 |
| WO | WO2005/115814 | * | 12/2005 |

OTHER PUBLICATIONS

PCT/EP2007/062365 International Search Report.

* cited by examiner

*Primary Examiner* — Gary Graham
(74) *Attorney, Agent, or Firm* — Michael Best & Friedrich LLP

(57) ABSTRACT

The invention is based on a wiper blade (10) comprising a wiper strip (12), in the lateral longitudinal grooves (20) of which two parallel spring rails (24) are inserted as a supporting element in the head strip (16), wherein a spoiler (30) and end caps (32, 48) are provided on the rails. The end caps (32, 48) each connect with a flow profile (34) to the spoiler (30) and extend at the front sides facing the ends of the wiper blade (10) toward a wiper lip (14) over the spring rails (24). It is proposed that at least one end cap (32, 48) comprises a closeable assembly opening (38) in the region overlapping the spring rails (24) and the head strip (16).

20 Claims, 2 Drawing Sheets

WIPER BLADE

BACKGROUND OF THE INVENTION

The invention is based on a wiper blade.

DE 102 45 693 A1 discloses a wiper blade which has, as supporting element, two spring rails which run in parallel and are connected to each other at their ends by a respective transverse clip. Furthermore, retaining means which fix the wiper strip relative to the spring rails are provided. In order to remove the wiper strip, the retaining means can easily be detached. They are connected on one side to the transverse clip and on the other side via a cohesive material joint, a frictional connection and/or via a form-fitting connection to the wiper strip. In one embodiment, a gudgeon reaches through a guide bore of the transverse clip into the wiper strip and is held in the assembly position by an end cap which latches on the transverse clip by means of a spring element. The spring element can be released by an externally operable element, and therefore the end cap and the gudgeon can be released in order to change the wiper strip. In the fitted state, the end cap is supported by a closed end side, which faces the end of the wiper blade, on the associated end side of the transverse clip. A different exemplary embodiment shows a retaining unit which is manufactured from sheet metal and is pressed into the wiper strip by means of a gudgeon bent toward the wiper strip. During the assembly of the spring rails, the retaining unit is pushed under the transverse clip and is latched on the transverse clip between stop surfaces and a spring tongue. After removal of the end cap, the spring tongue can be pressed into a release position, and therefore the spring rails can be removed.

WO 2005/115814 A1 discloses a wiper blade of the type in question, in which the retaining means are provided on an end cap. The spring rails are guided in inner guide profiles of the end caps, which guide profiles are closed on the end side facing the end of the wiper blade, and therefore the spring rails are fixed in the longitudinal direction relative to the end caps by means of the closed end surfaces. The end caps, for their part, are fixed in the longitudinal direction to the head strip of the wiper strip by releasable retaining means. The spring rails are therefore also fixed relative to the wiper strip via the end cap. A spring tongue is provided as the retaining means between the end cap and the head strip, said spring tongue running parallel to said head strip and, on its lower side, having a locking lug which, in the fitted state, engages in the head strip. So that the locking lug is not automatically released from the fitted position, the spring tongue can be blocked by a bar which presses the spring tongue together with the locking lug into a locking position against the head strip. During removal, the bar is released first before the spring tongue is raised. For better assembly and removal of the bar, the latter has a plurality of lateral recessed grips.

SUMMARY OF THE INVENTION

According to the invention, at least one end cap has a closeable assembly opening in the region which overlaps the spring rails. The wiper strip and, if appropriate, the spring rails can be fitted and removed through said assembly opening, and therefore a worn wiper strip can be exchanged for a new wiper strip without great effort. In this case, the end caps can be connected fixedly to a spoiler or can be guided releasably on the spring rails and can latch to the latter directly or via the transverse clip. In the case of the second alternative, the wiper strip can be changed without removal of the spring rails. If the spring rails are also to be changed, the latching of the end cap is released. For this purpose, said end cap expediently has, in the shallow part of its flow profile, a spring tongue which faces in the longitudinal direction of the wiper blade, can be actuated from the outside and latches by means of a latching lug to the transverse clip which connects the two spring rails to each other. In order also to be able to release the latching without a tool, it is advantageous if the spring tongue has an operating element, for example a handle, on its side facing outward.

The assembly opening can be closed by any suitable means, for example by a cover which latches to the end cap in the closed position, or a flap which is coupled to the end cap on one side, for example by means of a film hinge, while it is secured in the closed position by further latching means. A further advantageous possibility arises by means of a cross bar which is guided on the end cap by means of a guide profile and can be displaced transversely with respect to the longitudinal direction of the wiper blade. The cross bar is expediently secured in the closed position by a catch. For better handling of the cross bar, the latter has an outwardly facing gripping strip.

In addition to the retaining means cited, the wiper blade can have other retaining means, some of which are known from the prior art. A retaining spring can expediently be fastened to the transverse clip, said retaining spring facing the center of the wiper blade and, in the fitted state, pressing under a prestress against the wiper strip. The prestressing here is selected in such a manner that, firstly, a good assembly option is achieved and, secondly, adequate fixing is achieved. Furthermore, it can be provided that the spring deflection of the retaining spring is restricted by the end cap, and/or in that the contact pressure of the retaining spring is increased by the end cap. This can be realized in a simple manner in the case of a releasable end cap.

BRIEF DESCRIPTION OF THE DRAWINGS

Further advantages emerge from the following description of the drawing. The drawing illustrates exemplary embodiments of the invention. The drawing, the description and the claims contain numerous features in combination. A person skilled in the art will expediently also consider the features individually and put them together to form meaningful further combinations.

In the drawing.

DETAILED DESCRIPTION

Figure 1:
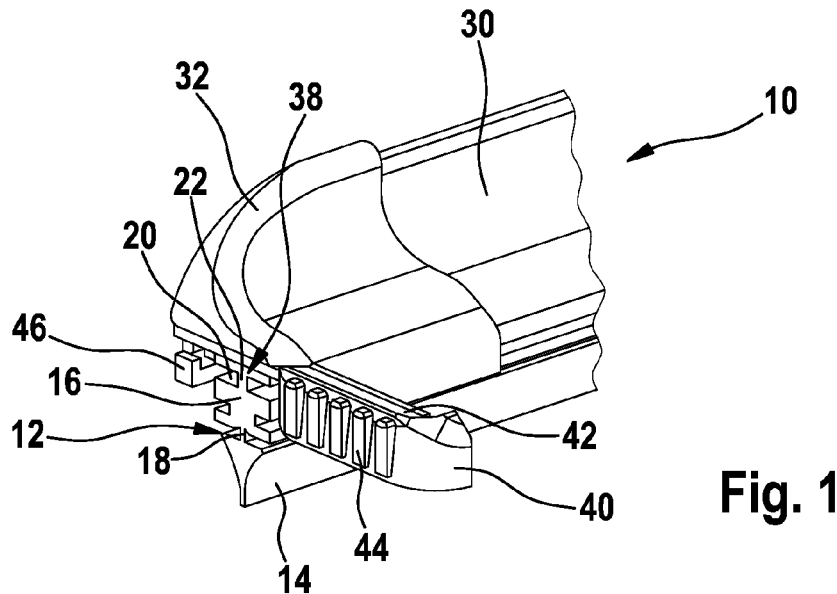
FIG. 1 shows a perspective partial view of a wiper blade with an open end cap.

A wiper blade 10 has a wiper strip 12 with a wiper lip 14 which is connected via a tilting web 18 to a head strip 16. The latter has, on the longitudinal sides thereof, longitudinal grooves 20 which form a web 22 between them and are bounded by a back strip 28 on the side facing away from the wiper lip 14. Spring rails 24 are located in the longitudinal grooves 20, said spring rails serving as a supporting element and protruding laterally for a distance out of the longitudinal grooves 20. A spoiler 30 is fitted on the protruding parts of the spring rails 24.

Figure 2:
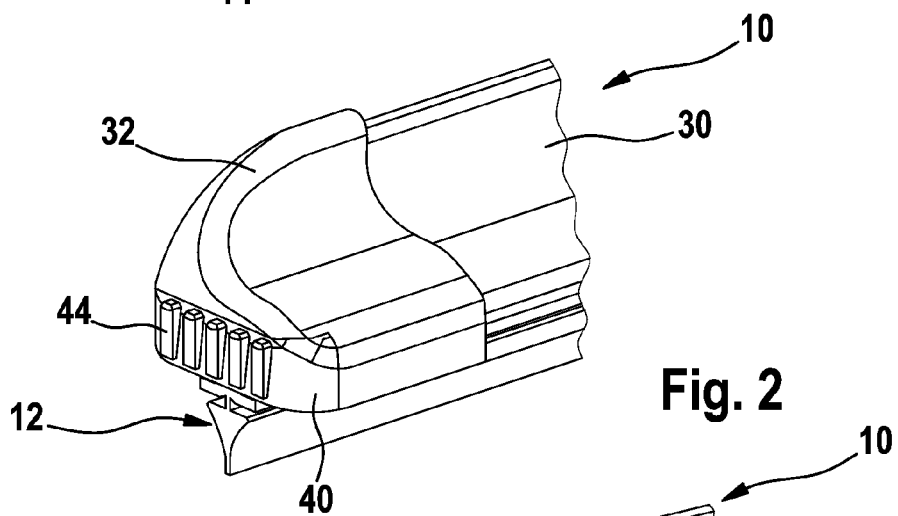
FIG. 2 shows a wiper blade according to FIG. 1 with a closed end cap.

In the embodiment according to FIGS. 1 and 2, end caps 32 are connected fixedly to the ends of the spoiler 30. On their end side facing the end of the wiper blade 10, said end caps reach over the spring rails 24 and correspondingly reach for a distance over the head strip 16 in the direction of the wiper lip 14. On the end side, the end cap 32 has, in the region of the head strip 16 and of the spring rails 24, an assembly opening 38 through which the wiper strip 12 and the spring rails 24 can be fitted.

Figure 3:
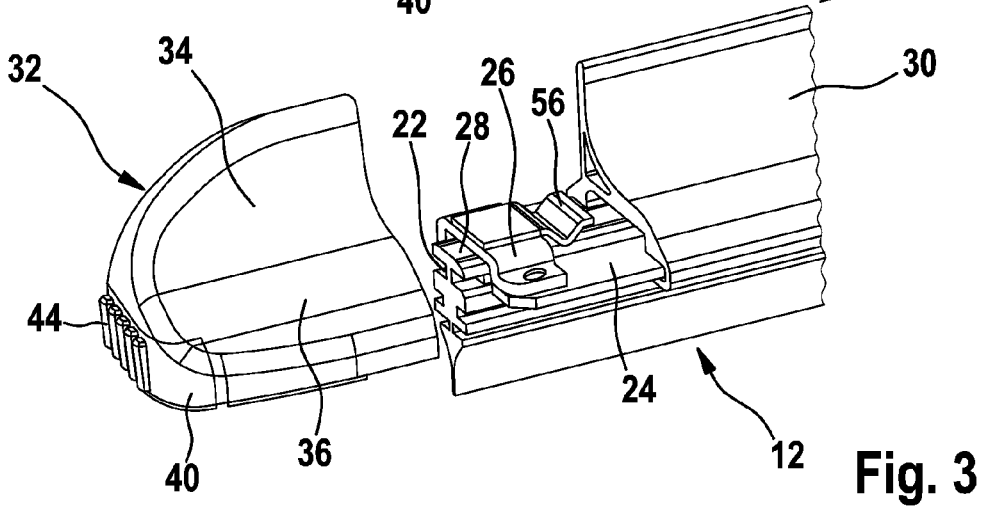
FIG. 3 shows a variant of a wiper blade according to FIG. 1 in a half-fitted state.

The assembly opening 38 can be closed by means of a cross bar 40. The latter is guided on the end cap 32 by a guide profile 42 and is secured in its closed end position by a catch 46. In the closed state, the cross bar 40 joins harmoniously into the overall contour of the end cap 32. For easier handling, it has an outwardly facing gripping strip 44. In the embodiment according to FIG. 3, the end cap 32 is illustrated separately from the spoiler 30. This embodiment has a transverse clip 26 by means of which the spring rails 24 are connected to each other and which spans the back strip 28 of the wiper strip 12. A retaining spring 56 is fastened to the transverse clip 26 in a suitable manner, for example by adhesive bonding, welding, soldering, clipping or the like. The retaining spring 56 has a profile which faces the center of the wiper blade 10, is V-shaped in the longitudinal direction and with which it presses against the head strip 16. The pressure against the head strip 16 can be reinforced by means of suitable devices in the end cap 32, on which devices the retaining spring 56 can be supported.

Figure 4:
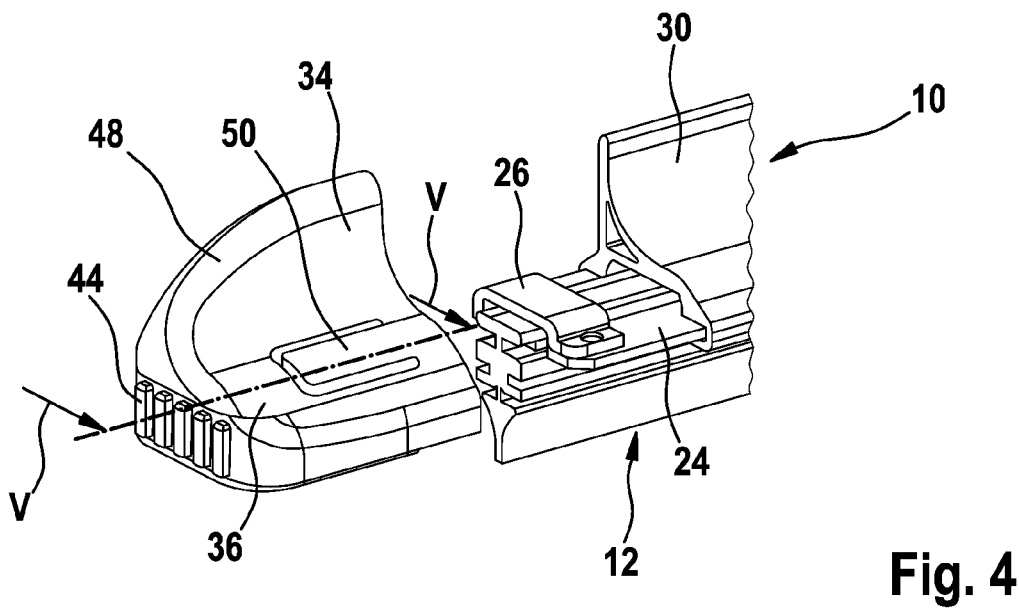
FIG. 4 shows a variant of FIG. 3.
Figure 5:
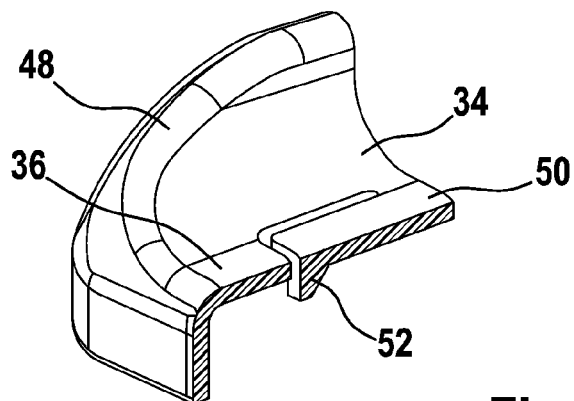
FIG. 5 shows a section corresponding to the line V-V in FIG. 4.
Figure 6:
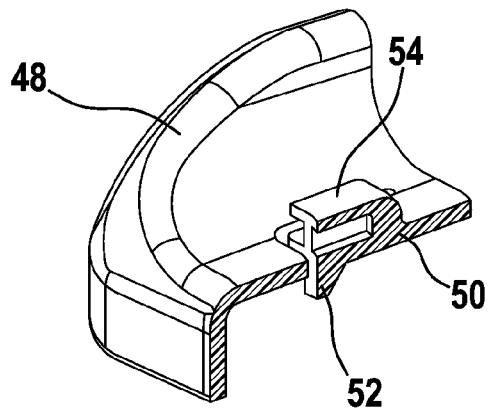
FIG. 6 shows a variant of FIG. 5.

The embodiment according to FIG. 4 has a releasable end cap 48. The latter has, in a shallow part 36 of the flow profile 34 of the end cap 48, a spring tongue 50 which faces in the longitudinal direction, can be operated from the outside and has a latching lug 52 at its free end. In the fitted state, said latching lug grips behind that end side of the transverse clip 26 which faces the center of the wiper blade 10, and therefore secures the end cap 48 in the longitudinal direction relative to the spring rails 24 on which said end cap is guided. In the embodiment according to FIG. 6, the end cap 48 has an operating element 54 in the form of a handle on the outside of its spring tongue 50, and therefore the latching mechanism of the spring tongue 50 can be released without a tool.

The invention claimed is:

1. A wiper blade (10) with a wiper strip (12) which in lateral longitudinal grooves (20) in its head strip (16), has, as supporting element, two spring rails (24) which run in parallel and on which a spoiler (30) and end caps (32, 48) are provided, wherein the end caps (32, 48) are each connected by a flow profile (34) to the spoiler (30) and, on their end sides facing the ends of the wiper blade (10), reach over the spring rails (24) toward a wiper lip (14), characterized in that at least one end cap (32, 48) has a closeable assembly opening (38) in the region which overlaps the spring rails (24) and the head strip (16), characterized in that the assembly opening (38) is closed by a cross bar (40) which slides linearly and transversely with respect to a longitudinal direction of the wiper blade (10) to open and close the closeable assembly opening (38).

2. The wiper blade (10) as claimed in claim 1, characterized in that the cross bar (40) is guided on the end cap (32, 48) by means of a guide profile (42).

3. The wiper blade (10) as claimed in claim 1, characterized in that the cross bar (40) has an outwardly facing gripping strip (44).

4. The wiper blade (10) as claimed in claim 1, characterized in that the cross bar (40) is secured in the closed position by a catch (46).

5. The wiper blade (10) as claimed in claim 1, characterized in that the spring rails (24) are connected to each other at their ends by a respective transverse clip (26) to which a retaining spring (56) is fastened, said retaining spring facing the center of the wiper blade (10) and pressing against a back strip (28) of the head strip (16).

6. The wiper blade (10) as claimed in claim 1, characterized in that the end cap (32) is fixedly connected to the spoiler (30).

7. The wiper blade (10) as claimed in claim 1, characterized in that the end cap (48) can be released and, in a shallow part (36) of the flow profile (34), has a spring tongue (50) which faces in the longitudinal direction of the wiper blade (10), can be actuated from outside and latches by means of a latching lug (52) to a transverse clip (26) which connects the two spring rails (24) to each other.

8. The wiper blade (10) as claimed in claim 7, characterized in that the spring tongue (50) has an operating element (54) on its side facing outward.

9. The wiper blade (10) as claimed in claim 1, characterized in that the wiper strip (12) is removable from the wiper blade (10) through the assembly opening (38).

10. The wiper blade (10) as claimed in claim 1, characterized in that the spring rails (24) are removable from the wiper blade (10) through the assembly opening (38).

11. A wiper blade (10) with a wiper strip (12), at least one supporting element for holding the wiper strip, and one or more end caps (32, 48) which are supported at retaining means on the respective ends of the supporting element, wherein at least one end cap (32, 48) prevents the wiper strip from being intentionally or unintentionally pulled out of or from the supporting element, characterized in that the at least one end cap (32, 48) has a cross bar (40) for opening and closing an assembly opening (38), and characterized in that the cross bar (40) slides linearly and transversely with respect to the longitudinal direction of the wiper blade (10) to open and close the assembly opening (38).

12. The wiper blade (10) as claimed in claim 11, characterized in that the cross bar (40) is guided on the end cap (32, 48) by means of a guide profile (42).

13. The wiper blade (10) as claimed in claim 11, characterized in that the cross bar (40) has an outwardly facing gripping strip (44).

14. The wiper blade (10) as claimed in claim 13, characterized in that the cross bar (40) is secured in the closed position by a catch (46).

15. The wiper blade (10) as claimed in claim 11, characterized in that the cross bar (40) is secured in the closed position by a catch (46).

16. The wiper blade (10) as claimed in claim 11, characterized in that the wiper strip (12) has, in lateral longitudinal grooves (20) in its head strip (16), as the supporting element, two spring rails (24) which run in parallel and on which a spoiler (30) and end caps (32, 48) are provided, wherein the end caps (32, 48) are each connected by a flow profile (34) to the spoiler (30) and, on their end sides facing the ends of the wiper blade (10), reach over the spring rails (24) toward a wiper lip (14), wherein the at least one end cap (32, 48) has the assembly opening (38) in the region which overlaps the spring rails (24) and the head strip (16).

17. The wiper blade (10) as claimed in claim 16, characterized in that the spring rails (24) are connected to each other at their ends by a respective transverse clip (26) to which a retaining spring (56) is fastened, said retaining spring facing the center of the wiper blade (10) and pressing against a back strip (28) of the head strip (16).

18. The wiper blade (10) as claimed in claim 16, characterized in that the spring rails (24) are removable from the wiper blade (10) through the assembly opening (38).

19. The wiper blade (10) as claimed in claim 12, characterized in that the wiper strip (12) is removable from the wiper blade (10) through the assembly opening (38).

20. A wiper blade (10) with a wiper strip (12) which in lateral longitudinal grooves (20) in its head strip (16), has, as supporting element, two spring rails (24) which run in parallel and on which a spoiler (30) and end caps (32, 48) are provided, wherein the end caps (32, 48) are each connected by a flow profile (34) to the spoiler (30) and, on their end sides facing the ends of the wiper blade (10), reach over the spring rails (24) toward a wiper lip (14), characterized in that at least one end cap (32, 48) has a closeable assembly opening (38) in the region which overlaps the spring rails (24) and the head strip (16), characterized in that the spring rails (24) are connected to each other at their ends by a respective transverse clip (26) to which a retaining spring (56) is fastened, said retaining spring facing the center of the wiper blade (10) and pressing against a back strip (28) of the head strip (16).

\* \* \* \* \*

UNITED STATES PATENT AND TRADEMARK OFFICE
CERTIFICATE OF CORRECTION

PATENT NO. : 8,424,149 B2  Page 1 of 1
APPLICATION NO. : 12/519192
DATED : April 23, 2013
INVENTOR(S) : Coemans et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 983 days.

Signed and Sealed this
Eighth Day of September, 2015

Michelle K. Lee
*Director of the United States Patent and Trademark Office*